United States Patent [19]
Bubb

[11] Patent Number: 5,912,950
[45] Date of Patent: *Jun. 15, 1999

[54] TELEPHONE NETWORK WITH NORMALLY OFF HOOK TELEPHONES

[75] Inventor: Howard Bubb, Mountain Lakes, N.J.

[73] Assignee: Dialogic Corporation, Parsippany, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/594,016

[22] Filed: Jan. 30, 1996

[51] Int. Cl.$^6$ ..................................................... H04M 1/64

[52] U.S. Cl. ..................... 379/88.21; 379/76; 379/88.03; 379/171

[58] Field of Search .................................. 379/67, 88, 89, 379/167, 171, 201, 210–214, 67.01, 88.01, 88.02, 88.03, 88.19, 88.21, 75, 76

[56] References Cited

U.S. PATENT DOCUMENTS

| | | | |
|---|---|---|---|
| 4,203,011 | 5/1980 | Coviello | 379/165 |
| 4,953,159 | 8/1990 | Hayden et al. | 370/62 |
| 5,452,289 | 9/1995 | Sharma et al. | 370/81 |
| 5,594,784 | 1/1997 | Velius | 379/88 |
| 5,675,632 | 10/1997 | Odaka et al. | 379/67 |

*Primary Examiner*—Fan S. Tsang
*Attorney, Agent, or Firm*—Kaplan & Gilman, LLP

[57] ABSTRACT

An improved telephone switching arrangement in which all of the telephones (i.e.; audio terminals) are in a normally off hook state. The user desiring to place a call need not take the telephone off hook or change the electrical state of the connection between the telephone switching equipment and the audio terminal. In a preferred embodiment, the called party's telephone number to be dialed is transmitted from a personal computer to the telephone switching equipment.

9 Claims, 3 Drawing Sheets

TELEPHONE NETWORK WITH NORMALLY OFF HOOK TELEPHONES

TECHNICAL FIELD

This invention relates to telephony, and more specifically, to an improved technique of allowing users to access a telephone switch and to establish communications with other users.

BACKGROUND OF THE INVENTION

Recently, modern business telephone systems utilize microprocessor based telephone terminals on every user's desk. These audio terminals are usually digitally based, include various functions such as call blocking, call forwarding, etc., and are highly programmable. Indeed, a typical business telephone system includes dozens if not hundreds of microprocessors, since each audio terminal is, for all intents and purposes, a computer.

Despite the tremendous advance in computer and telephone technology, the basic function of taking a telephone off hook, waiting for dial tone, dialing a desired number, and establishing a communications channel with a remote user, has remained substantially unchanged for over a hundred years. Specifically, this protocol typically involves a user making a service request by taking a telephone off hook. The act of taking the telephone off hook causes a change in electrical state which is interpreted by the telephone switching equipment as a request by the user of that telephone for some type of service. The telephone switch, CO, PBX, or other similar equipment, then signals the user with an acknowledgement of the user's request for service. This acknowledgement is what is commonly termed as dial tone. The user then inputs the number corresponding to the desired remote user with which a connection is desired, and the switching equipment establishes the connection.

In modern telephone systems, a business entity usually has on-site telephone equipment which is termed, for example, a PBX. The PBX can establish connections between the public telephone network and any one or more users within the company, as well as between users within the company. Additionally, the PBX may be connected to computer equipment via a local area network such that communications can be established from a computer to the PBX, and out over the public telephone network. Additionally, a computer can be used to send a signal to the PBX, instructing the PBX to dial a remote user, and then ring back a local user within the company to thereby establish the connection.

For example, with reference to FIG. 1, the previously mentioned protocol might operate, in an exemplary embodiment, as follows: A user of computer 105*a* decides to call a remote user, either within the company or outside the company. The user of computer 105*a* then elects to do so by "clicking" on the particular user. This clicking is accomplished in a well known manner by placing a cursor within an icon and then activating a button.

The software in computer 105*a* transmits a signal over LAN 104 to PBX 101, which signal includes the desired remote number, as well as the requesting user's telephone number. The PBX receives the signal, dials the remote user, and then dials the telephone number of the requesting user. The communication channel is then established upon the requesting user and the called user picking up their handsets, thereby taking their respective telephones off hook. In systems where the requesting user's telephone is digital, the PBX can, if desired, automatically take the requesting user's telephone off hook so that after selecting the desired telephone number to be called, the user simply hears the remote telephone ringing as usual.

Several problems exist with the above arrangement. First, the user friendliness of the protocol leaves much to be desired. After the requesting user selects the number to be called, there is really little or no reason for him to have to have his phone ring and pick it up. If he is using an old fashioned standard analog telephone device, there is no way for the PBX to signal the device to automatically go off hook. Thus the user's phone must ring and he must physically take it off hook. Moreover, if the system is such that the requesting user has the more modern digital telephone equipment, then the fact that each telephone in the system is, in actuality, a microprocessor based audio terminal, greatly increases the cost of the system. Indeed, many systems presently manufactured require each user to have a telephone which costs many hundreds of dollars.

In view of the above, it can be appreciated that there exists a need of the prior art for a telephone system and switching arrangement whereby users can select a telephone number to be called from their computer and establish an audio connection with a remote user using a simple audio device rather than a complex digital device.

SUMMARY OF THE INVENTION

The above and other problems of the prior art are overcome in accordance with the present invention which relates to a telephone switching arrangement in which all of the telephone terminals are in the normally off hook state.

Specifically, the default condition of the audio terminal and switching arrangement is that there is a normally closed communication path between each audio terminal and the switch. When it is desired to call another user, a personal computer is used to instruct the switch to connect the two users with one another. In the preferred embodiments, the called user's audio terminal need not even ring but rather, an announcement can simply come on indicating the calling party's name, or other information.

Advantages of the invention include the ability to utilize low cost audio terminals at each user's desk, rather than complex microprocessor based devices, since all of the intelligence is centralized at the PBX or other switch. Additionally, a more user friendly interface is seen since a user need not hear his own phone ring and lift it off hook.

DETAILED DESCRIPTION OF THE PREFERRED EMBODIMENT

Figure 1:
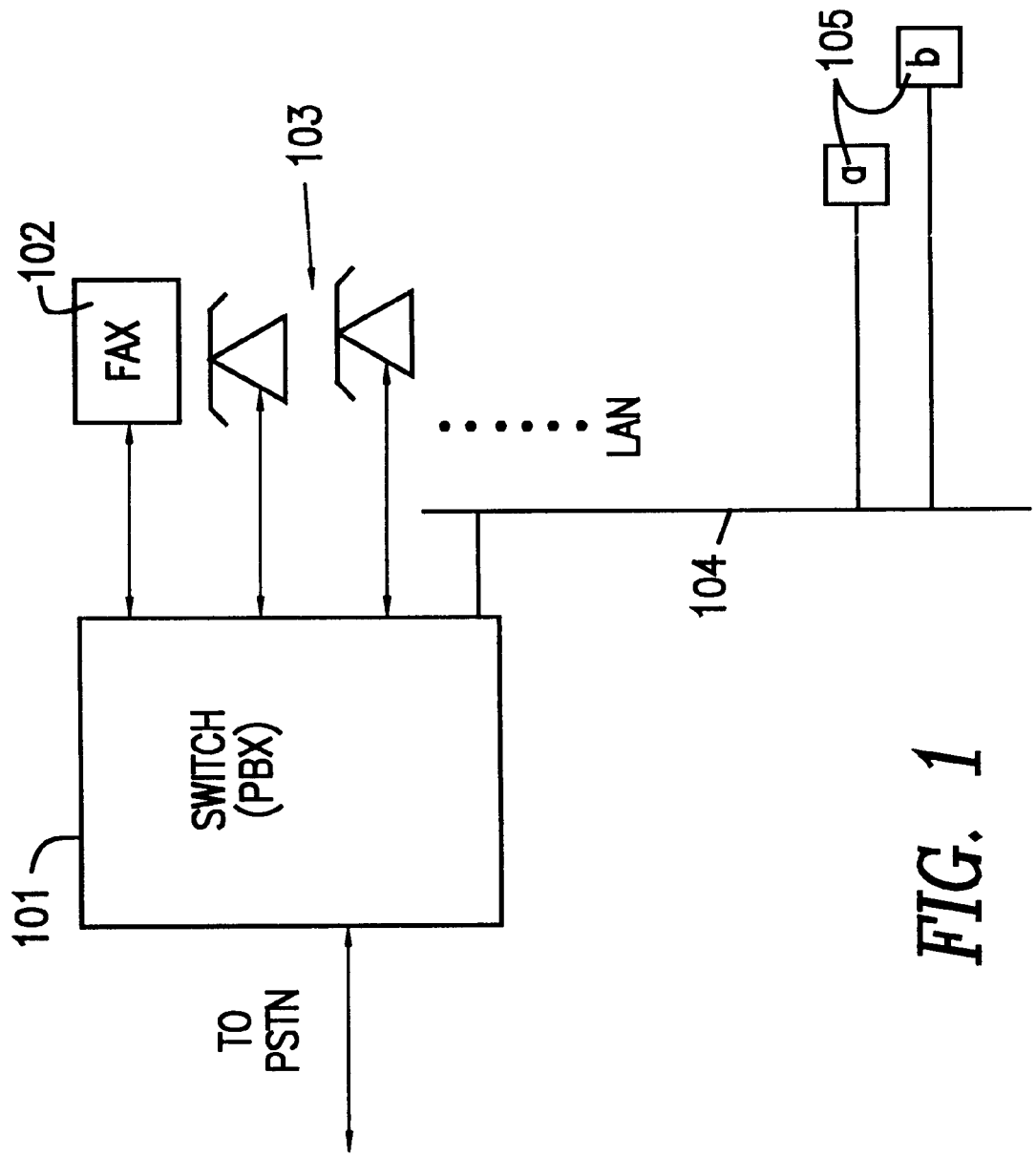
FIG. 1 shows a prior art PBX arrangement with a local area network connected thereto.
Figure 2:
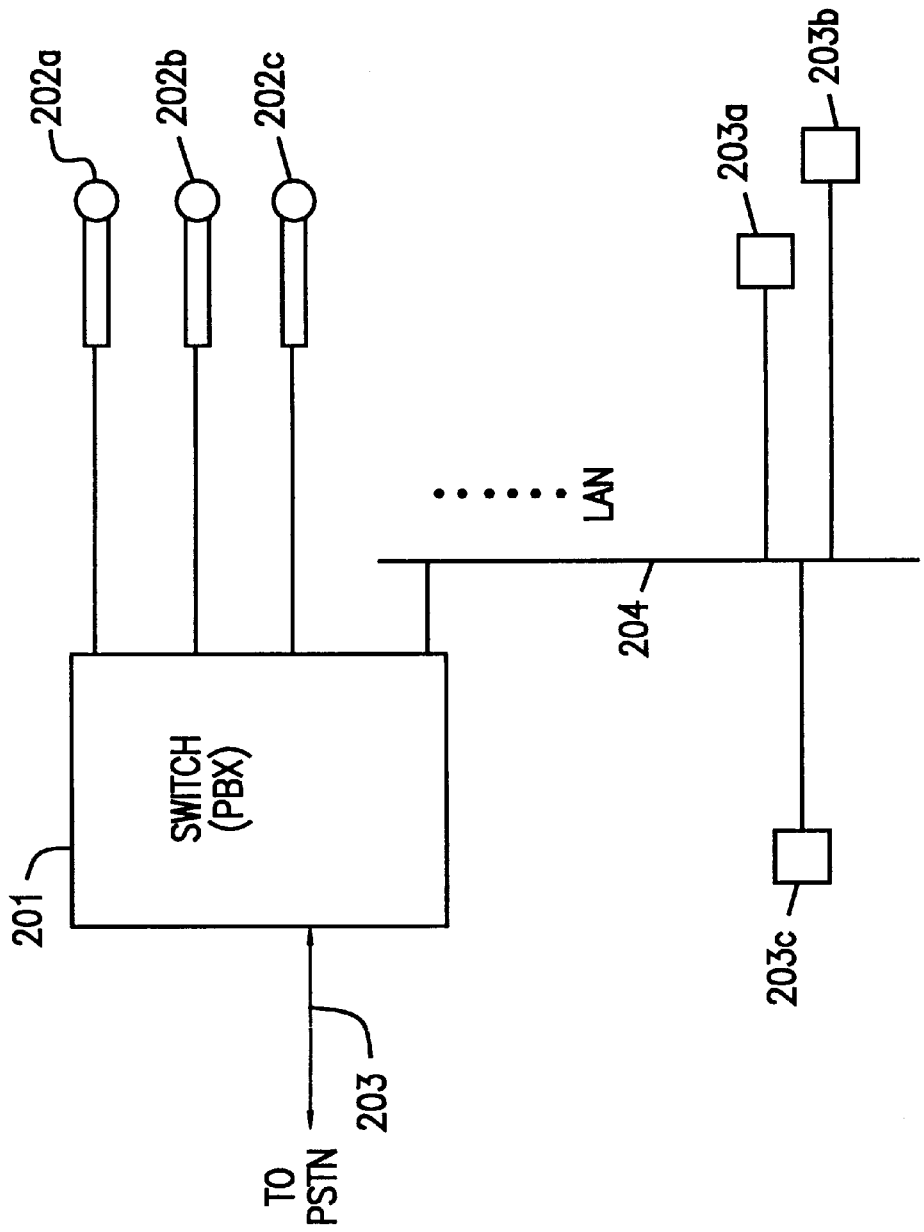
FIG. 2 shows a conceptual diagram of an embodiment of the present invention.

FIG. 2 indicates, in block diagram form, a preferred embodiment of the present invention. The arrangement of FIG. 2 includes a PBX 201, utilized to interconnect the public switched telephone network (PSTN) to a variety of in house devices 202–203. Audio terminals 202 are simple two way speakers/microphones, and computers 203 may be any type of personal computers. The functionality required for these two way speakers/microphones is already available in a conventional speakerphone. Thus, by taking a conventional speakerphone and removing all of the functionality except the basic ability to receive and transmit speech, one can construct a simple low cost audio terminal for use with the present invention.

A LAN 204 is utilized to connect PBX 201 to one or more computer devices 203. The LAN may include any of a variety of well known hardware and software.

In operation, audio terminals 202 are normally connected to PBX 201 as shown and typically in a state such that audio can be carried to and from audio terminals 202 from PBX 201. In a preferred embodiment, each user will have both a computing device 203 and an audio terminal 202 in his office. The audio terminal 202 may be a separate device, or may be part of the computer itself.

For purposes of explanation herein we presume that there are three users in this system A, B, and C. User A has an audio terminal 202a and a computing device 203a at his office, while user B has an audio terminal 202b and a computing device 203b in his office. Similarly, user C has an audio terminal 202c and computing device 203c in his office and there may be dozens of other users as well.

When user A desires to telephone user C, he selects user C from his menu driven software running on computer 203a, and a connection is automatically made from audio terminal 202a to audio terminal 202c. The computer 203a accomplishes such connection by transmitting a message to PBX 201 instructing it to connect the desired two terminals, the terminal to be called being designated by a telephone number. After the connection is formed, computer 203a may automatically announce an audio message for audio terminal 202c, indicating that user A has initiated a telephone call.

Importantly, the simplistic audio terminal 202a need not even ring nor be taken physically off hook by the user of 202a. Additionally, and in the preferred embodiment, audio terminal 202c need not ring either nor be taken physically off hook. Rather, an audio announcement simply is transmitted informing both users that a connection is in place.

It is also possible to complete telephone calls in a similar manner to remote users at other parts of the PSTN. For example, consider user 202b desiring to make a telephone call to a remote user, even in a different country. User B simply selects the remote user from his menu driven software, as previously described, and a signal is transmitted to PBX 201 indicating that the user's telephone number should be dialed. When such dialing occurs, the audio terminal 202b, already being off hook, is connected through switch 201 to PSTN 205 for completion of the call in the normal manner.

The important aspect of the invention is that the standard protocol for interaction between the initiating user and the switch has been modified. Specifically, the basic protocol always used was that the audio device is first taken off hook, thereby establishing an audio path from the telephone to the switch and sending a signal to the switch which informs the switch that the user is requesting service. The switch then acknowledges the service request by transmitting dial tone, and the user begins dialing.

In the present invention, no service request or acknowledgement is needed. Rather, the PBX or switch is always available to service any requests for telephone connections. Thus, the audio path from the switch to the calling party's terminal already exists before the caller enters a request for service. Additionally, the request for service may be entered by the calling party's computer instructing the switch to connect the calling and called parties, not by taking the calling terminal off hook.

Figure 3:
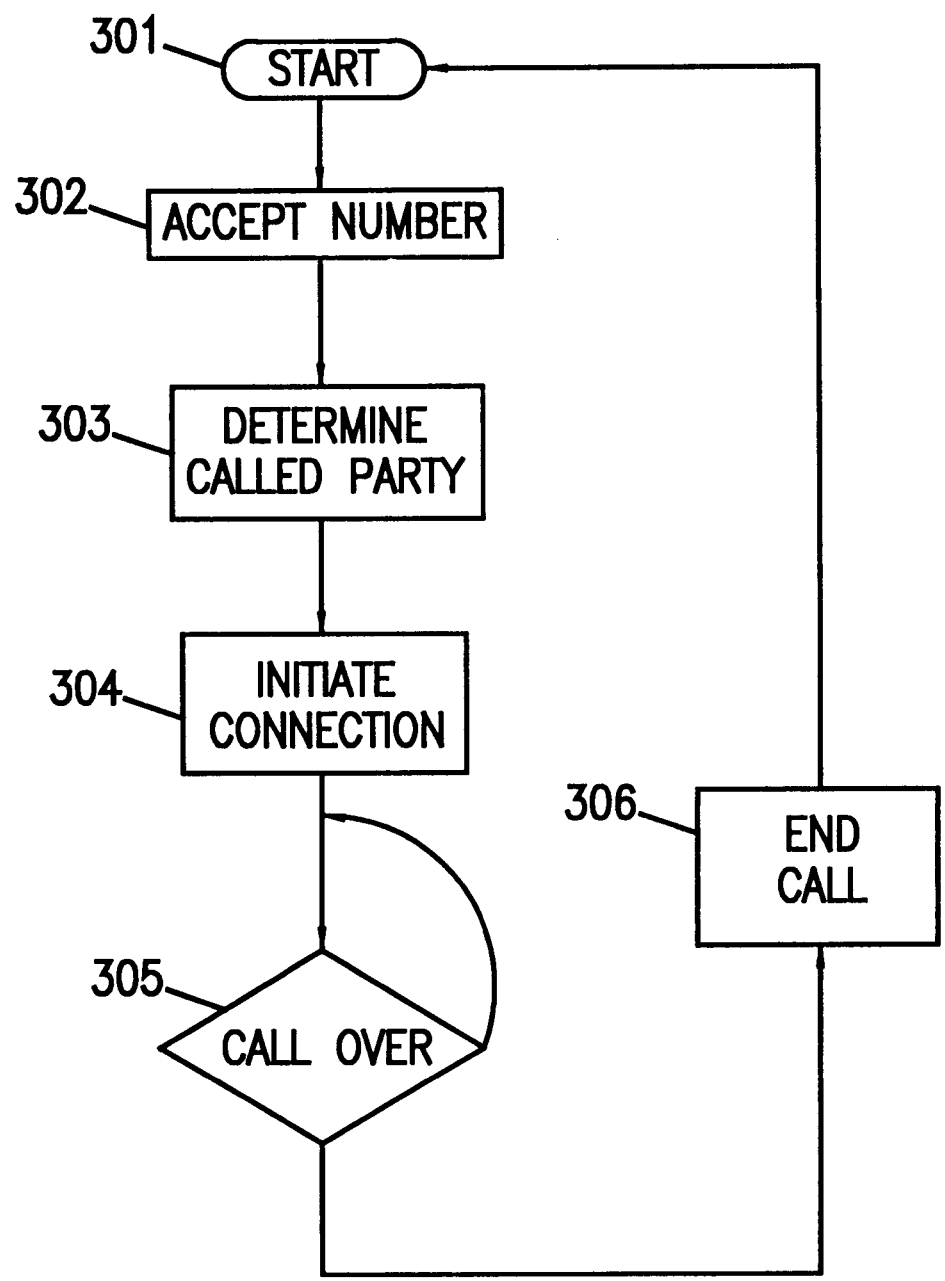
FIG. 3 depicts a basic flow chart for implementing the present invention.

FIG. 3 shows a flow chart which can be used for implementation of the present invention. The flow chart is intended to represent the algorithm which would be implemented, for example, in switch 201 of FIG. 2.

The program is entered at start 301 and the telephone number to be called is accepted at block 302. The telephone number can be transmitted from one of computing devices 203 via LAN 204 to switch 201 or from some other source. The communications between computing devices 203 and switch 201 may be in accordance with any standard protocol for data transfer, such as, for example, IEEE 802. At block 302, the number is accepted by the switch 201 and the switch determines the called party through a table look-up.

Block 303, labeled determine called party, is a simple table look up or other conventional technique for parsing the information contained in the telephone number in order to determine the called party. The result of operational block 303 is transferred to operational block 304, which initiates a connection to a called party. If the called party is an internal user, connected to switch 201, then the call can be completed by establishing an appropriate circuit. Otherwise, initiate connection block 304 will form a connection to the remote called party from the switch 201 over the PSTN or other network, as a standard and conventional telephone connection is established. Once the connection is established, decision block 305 simply waits until the call is complete before disconnecting the called party from the calling party at block 306. The signal to end the call may be accomplished by one of the user's signalling the PBX from a personal computer, by a timeout after a predetermined time period of no voice activity which meets a predetermined threshold, by conventional PSTN signalling for call termination, or by any other convenient technique.

The separate, out-of-band signal typically used as a ring signal can be eliminated. Rather, since the called party's telephone can also be in the normally off-hook state, it can simply announce a message generated from the switch or from the calling party's terminal.

The replacement of the separate out of band signal with an in-band announcement leads to an additional enhancement. The calling party can select and program numerous "ring" signals, or outgoing announcements. For example, the various announcements can be stored at the caller's computer. The caller may click a particular icon to instruct the switch or PBX to transmit a particular first announcement to a particular called number. Upon selection, the appropriate announcement is read from the calling party's computer and transmitted to the called party's terminal to announce the initiation of a call.

Since numerous announcements can be stored on the caller's computer, the caller can change the announcement based on parameters such as time of day, called party, or any other desired parameter. The outgoing announcement can be selected on a "per call" basis as well. Any other criteria may be used for permitting the calling party to remotely select the announcement which occurs at the called terminal. It is important that the system ensure that a caller and called audio terminal are not connected without any announcement at the called terminal. Without this feature, a calling terminal could call a called terminal, form a connection thereto, and effectively implement an audio eavesdrop of the called party's area. This potential problem is effectively avoided by ensuring that the switch provide some audio indicator of the call, be it a conventional ring signal or the selected announcement.

One enhanced embodiment provides that the end of the call can be signaled through a voice recognition unit installed at PBX 201. Specifically, there are widely available algorithms which can train to a user's voice and recognize particular commands. Thus, the PBX 201 could include such a voice recognition algorithm which recognizes the term "end call" and uses that term as a signal to disconnect the calling and called party. Alternatively, the end call command could be issued from a computing device 203 or through any other technique.

It can be appreciated that while the above describes the preferred embodiment of the invention, various other modifications and/or additions will be apparent to those of ordinary skill in the art. Importantly, the general concept of permitting a user to request service without first changing the electrical state of the switch to audio terminal connection by taking the audio terminal off hook has been eliminated. Thus, most of the intelligence usually present in audio terminals can be implemented at the PBX or other centralized location. The audio terminals can be replaced with much simpler terminals, as described previously, and all of the intelligence typically built into such audio terminals can be implemented at the PBX through commands received either by voice recognition or from the user's computing device.

The above and other various modifications of the invention are intended to be covered by the following claims.

I claim:

1. In a telephone switching arrangement comprising a plurality of audio terminals and a switch for interconnecting said audio terminals, a method of completing a call from a calling audio terminal to a called audio terminal comprising the steps of:

establishing a first audio connection from a calling audio terminal to a switch prior to a calling user requesting service from said switch;

transmitting to said switch a number identifying said called terminal;

receiving at said switch, said number identifying said called terminal;

forming a second audio connection from said calling terminal to said called terminal.

2. The method of claim 1 wherein said first audio connection remains constantly established by maintaining a first completed communications path between said calling audio terminal and said switch and a second completed communications path between said called audio terminal and said switch.

3. The method of claim 1 wherein said step of transmitting includes the step of transmitting said number from a computer terminal.

4. The method of claim 3 wherein said computer terminal is neither said called terminal nor said calling terminal.

5. In a telephone system comprising a plurality of audio terminals, each of which may be connected to any other of which by a circuit switched connection formed through one or more telephone switches, a method of connecting a first audio terminal used by a first user to a second audio terminal used by a second user comprising the steps of:

establishing a first audio connection from said first audio terminal to a first switch prior to said first user requesting service from said first switch;

informing said one or more telephone switches that it is desirable to connect said first and second audio terminals; and announcing a message at said second audio terminal to be called in order to inform said second user of said called audio terminal that a connection thereto is desired, said message being composed by and transmitted from said first user.

6. The method of claim 5 further comprising the step of selecting said message from a plurality of stored messages.

7. A telephone switching arrangement comprising:

a plurality of audio terminals;

a switch for interconnecting at least two of said audio terminals to form a connection;

establishing a first audio connection from one of said two of audio terminals to said switch prior to a user of said terminal requesting service from said switch;

means for transmitting to said switch (i) a number identifying a terminal to be called, and (ii) an announcement to be made to a called user to announce the initiation of said connection.

8. The switching arrangement of claim 7 wherein said means for transmitting includes means for transmitting said number from a computer terminal.

9. The switching arrangement of claim 8 wherein said computer terminal is neither said called terminal nor said calling terminal.

\* \* \* \* \*